(12) United States Patent
Hashimoto et al.

(10) Patent No.: US 11,878,423 B2
(45) Date of Patent: Jan. 23, 2024

(54) ROBOT SYSTEM

(71) Applicant: KAWASAKI JUKOGYO KABUSHIKI KAISHA, Kobe (JP)

(72) Inventors: Yasuhiko Hashimoto, Kobe (JP); Shigetsugu Tanaka, Akashi (JP); Masayuki Kamon, Akashi (JP); Yoshihiko Maruyama, Osaka (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 531 days.

(21) Appl. No.: 17/265,073

(22) PCT Filed: Jul. 30, 2019

(86) PCT No.: PCT/JP2019/029781
§ 371 (c)(1),
(2) Date: Feb. 1, 2021

(87) PCT Pub. No.: WO2020/027105
PCT Pub. Date: Feb. 6, 2020

(65) Prior Publication Data
US 2021/0316454 A1 Oct. 14, 2021

(30) Foreign Application Priority Data
Jul. 31, 2018 (JP) .................................. 2018-143136

(51) Int. Cl.
*B25J 9/16* (2006.01)
*B25J 3/00* (2006.01)

(52) U.S. Cl.
CPC ............... *B25J 9/1664* (2013.01); *B25J 3/00* (2013.01); *B25J 9/1653* (2013.01); *B25J 9/1682* (2013.01); *B25J 9/1651* (2013.01); *B25J 9/1697* (2013.01)

(58) Field of Classification Search
CPC . B25J 9/1664; B25J 3/00; B25J 9/1653; B25J 9/1682; B25J 9/1651; B25J 9/1697
See application file for complete search history.

(56) References Cited

U.S. PATENT DOCUMENTS

| 7,450,127 B2 * | 11/2008 | Hong | G05B 19/4103 345/619 |
| 2015/0148956 A1 * | 5/2015 | Negishi | B25J 9/163 700/253 |

(Continued)

FOREIGN PATENT DOCUMENTS

| EP | 2255931 A2 * | 12/2010 | ............ B25J 9/1633 |
| JP | H07-205059 A | 8/1995 | |

(Continued)

*Primary Examiner* — Khoi H Tran
*Assistant Examiner* — Tristan J Greiner
(74) *Attorney, Agent, or Firm* — Oliff PLC

(57) ABSTRACT

A robot system includes a robot body, a memory, an operation controlling module, a manipulator, and a limit range setting module configured to set a limit range of the corrective manipulation by the manipulator. The operation controlling module executes a given limiting processing when a corrective manipulation is performed beyond the limit range from an operational position based on automatic operation information. The limit range setting module calculates a positional deviation between the operational position based on the automatic operation information before the correction and an operational position based on the corrected operation information, and when the positional deviation is at or below a first threshold, narrows the limit range in the next corrective manipulation by the manipulator.

4 Claims, 6 Drawing Sheets

(56) References Cited

U.S. PATENT DOCUMENTS

2016/0263744 A1* 9/2016 Dzierzega .............. B25J 9/1664
2017/0364076 A1* 12/2017 Keshmiri ............... G05B 19/41

FOREIGN PATENT DOCUMENTS

| JP | 2011194497 A | * | 10/2011 | | |
| JP | 2013-071231 A | | 4/2013 | | |
| WO | WO-2017033356 A1 | * | 3/2017 | ............. | A61B 34/32 |

* cited by examiner

ROBOT SYSTEM

TECHNICAL FIELD

The present disclosure relates to a robot system.

BACKGROUND ART

Conventionally, industrial robots automatically perform a repetitive work, such as welding, painting, assembling parts, and applying sealant, at a manufacturing site. In order to cause the robot to work, teaching is required, in which information necessary for the work is instructed to the robot and the robot stores the information. Methods for teaching the robot are, for example, a direct teaching in which a teaching person directly touches the robot to move it, a remote-control teaching using a teaching pendant, a teaching through programming, and a master-slave teaching. For example, Patent Document 1 discloses one example of the teaching in which a robotic arm is caused to memorize a path for performing a work through the direct teaching.

REFERENCE DOCUMENT OF CONVENTIONAL ART

Patent Document

[Patent Document 1] JP2013-071231A

DESCRIPTION OF THE DISCLOSURE

Problems to be Solved by the Disclosure

Meanwhile, a part of the operation taught to the robot may need to be changed for various reasons. For example, when a position of the work target of the robot is partially changed from a taught position due to a lot change of workpieces etc., the robot may fail to achieve the target work, or an accuracy of the work may degrade. Moreover, it may be found out after the teaching is finished that a problem may occur to a part of the work if performed based on teaching information initially created. In such a case, teaching is performed again to change the teaching information used for an automatic operation of the robot. However, teaching often requires technique of an expert and a lot of time and effort, thus being burdensome for the teaching person. The same applies to a case when partially changing the operation of the robot.

Therefore, one purpose of the present disclosure is to provide a robot system, capable of easily and appropriately correcting operation of a robot set in advance.

SUMMARY OF THE DISCLOSURE

A robot system according to one aspect of the present disclosure includes a robot body, a memory configured to store automatic operation information for causing the robot body to perform a given operation, an operation controlling module configured to control the operation of the robot body based on the automatic operation information, a manipulator configured to generate corrective manipulation information based on a corrective manipulation for correcting the operation of the robot body under operation based on the automatic operation information, and a limit range setting module configured to set a limit range of the corrective manipulation by the manipulator. The operation controlling module acquires the corrective manipulation information and controls the robot body to perform a corrected operation based on the corrective manipulation information. The memory stores corrected operation information based on the corrected operation as the next automatic operation information. The operation controlling module executes a given limiting processing when the corrective manipulation is performed beyond the limit range from an operational position based on the automatic operation information. The limit range setting module calculates a positional deviation between the operational position based on the automatic operation information before the correction and an operational position based on the corrected operation information, and when the positional deviation is at or below a first threshold, narrows the limit range in the next corrective manipulation by the manipulator.

According to this configuration, the operation of the robot body can be corrected in real time based on the corrective manipulation by the manipulator during the operation of the robot body based on the automatic operation information. Moreover, the given limit range is set for the corrective manipulation, and the given limiting processing is executed when the corrective manipulation is performed beyond this limit range. When the positional deviation between the operational position based on the automatic operation information before the correction and the corrected operation based on the corrected operation information is at or below the first threshold, the limit range in the next operation of the robot body based on the corrected automatic operation information is set to the limit range narrower than the limit range used in the preceding operation. As a result, when the amount of correction from the automatic operation information is smaller, the given limiting processing is more easily started in the next corrective manipulation. In this manner, the range in which the corrective manipulation is permitted without limitation becomes narrower as the correcting amount decreases. Therefore, when the correction of the operation of the robot body is repeated, the operation of the robot body can be more easily converged to an ideal operation. Thus, the operation of the robot set in advance can be corrected easily and appropriately.

The limit range setting module may widen the limit range in the next corrective manipulation by the manipulator when the positional deviation is above a second threshold that is larger than the first threshold.

In this case, when the amount of correction from the automatic operation information is larger, the given limiting processing is difficult to be started in the next corrective manipulation. In this manner, the range in which the corrective manipulation is permitted without limitation becomes wider as the correction amount increases, and thus, the amount of manipulation required for the correction is secured.

The operation controlling module may regulate the robot body from moving outside the limit range as the given limiting processing.

The manipulator may include a correction success-failure inputting part configured to receive an input of success-failure information concerning whether the operational position based on the corrected operation information is valid. The limit range setting module may narrow the limit range when the positional deviation is at or below the first threshold and the inputted success-failure information indicates that the operational position based on the corrected operation information is valid.

According to this configuration, when the positional deviation is at or below the first threshold and the operational position based on the corrected operation information is valid, the limit range is narrower than the preceding one.

Therefore, it is prevented that the next limit range becomes narrower due to an erroneous corrective manipulation.

The robot body may include a slave arm, and the manipulator may include a master arm installed outside a work range of the slave arm.

Effect of the Disclosure

According to the present disclosure, a robot system capable of easily and appropriately correcting operation of a robot set in advance can be provided.

MODE FOR CARRYING OUT THE DISCLOSURE

Figure 1:
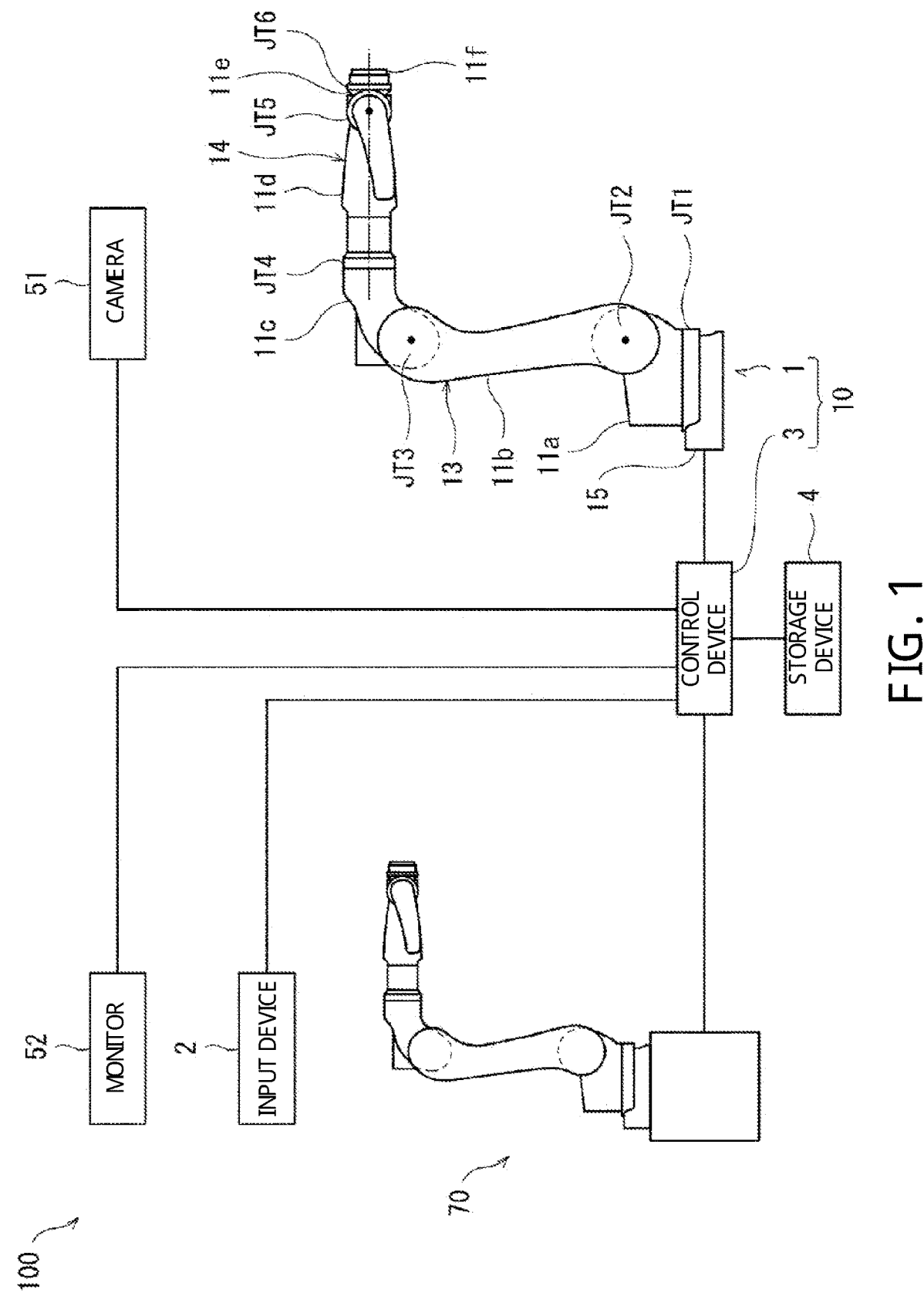
FIG. 1 is a schematic view illustrating a configuration of a robot system according to one embodiment.

Hereinafter, one desirable embodiment of the present disclosure will be described with reference to the accompanying drawings. Note that, below, the same reference characters are assigned to the same or corresponding elements throughout the drawings to omit redundant description.

FIG. 1 is a schematic view illustrating a configuration of a robot system according to one embodiment. A robot system 100 of this embodiment is a system utilizing a master-slave robot. As illustrated in FIG. 1, the robot system 100 according to this embodiment is provided with a robot 10, an input device 2 including a master arm 70, and a storage device 4.

In the robot system 100, an operator located separately from a work range of a slave arm 1 (outside the work range) moves the master arm 70 to input a command, and the slave arm 1 operates corresponding to the command so as to perform a certain work. Moreover, in the robot system 100, the slave arm 1 can automatically perform a given work without the master arm 70 being manipulated by the operator.

Herein, an operation mode in which the slave arm 1 is operated in accordance with the command inputted via the master arm 70 is referred to as a "manual mode." In this manual mode, the operation of the slave arm 1 is controlled by a control device 3 without using automatic operation information stored in the storage device 4, but controlled based on manipulation information (operation command) received from the input device 2 which is manipulated by the operator. Note that the "manual mode" includes a case in which the operation of the slave arm 1 is partially corrected automatically while the slave arm 1 operates based on the command inputted by the master arm 70 being manipulated by the operator.

Moreover, an operation mode in which the slave arm 1 is operated in accordance with a task program set in advance is referred to as an "automatic mode." In this automatic mode, the operation of the slave arm 1 is controlled by the control device 3 based on the automatic operation information stored in the storage device 4.

Moreover, the robot system 100 according to this embodiment can correct the operation which was to be performed automatically, by reflecting the manipulation of the master arm 70 to the operation of the slave arm 1 under the automatic operation of the slave arm 1. Herein, an operation mode in which the slave arm 1 is operated in accordance with the task program set in advance while corrective manipulation information based on a corrective manipulation by the master arm 70 is reflectable to the operation of the slave arm 1 based on the automatic operation information, is referred to as a "correctable automatic mode." Note that the "automatic mode" is distinguished from the "correctable automatic mode" in that the manipulation by the master arm 70 is not reflected to the operation of the slave arm 1 when the operation mode to operate the slave arm 1 is the automatic mode.

(Robot 10)

The robot 10 is provided with the slave arm 1, an end effector (not illustrated) attached to a tip end of the slave arm 1, and the control device 3 which controls operation of the slave arm 1 and the end effector. The slave arm 1 is provided with a pedestal 15, an arm part 13 supported by the pedestal 15, and a wrist part 14 supported by a tip end of the arm part 13 and to which the end effector is attached. In this embodiment, the slave arm 1 and the end effector constitute a robot body.

As illustrated in FIG. 1, the slave arm 1 is an articulated robotic arm having a plurality of (e.g., three or more) joints JT1-JT6, and it is constituted by serially coupling a plurality of links 11a-11f. In more detail, in the first joint JT1, the pedestal 15 and a base-end part of the first link 11a are coupled to each other rotatably on an axis extending in the vertical direction. In the second joint JT2, a tip-end part of the first link 11a and a base-end part of the second link 11b are coupled to each other rotatably on an axis extending in the horizontal direction. In the third joint JT3, a tip-end part of the second link 11b and a base-end part of the third link 11c are coupled to each other rotatably on an axis extending in the horizontal direction. In the fourth joint JT4, a tip-end part of the third link 11c and a base-end part of the fourth link 11d are coupled to each other rotatably on an axis extending in the longitudinal direction of the fourth link 11d. In the fifth joint JT5, a tip-end part of the fourth link 11d and a base-end part of the fifth link 11e are coupled to each other rotatably on an axis perpendicular to the longitudinal direction of the link 11d. In the sixth joint JT6, a tip-end part of the fifth link 11e and a base-end part of the sixth link 11f are coupled to each other rotatably in a twistable manner. Further, a mechanical interface is provided to a tip-end part of the sixth link 11f. The end effector corresponding to the content of work is detachably attached to the mechanical interface.

The arm part 13 of the slave arm 1 is formed by a coupling body of the links and the joints comprised of the first joint JT1, the first link 11a, the second joint JT2, the second link 11b, the third joint JT3, and the third link 11c. Moreover, the wrist part 14 of the slave arm 1 is formed by a coupling body of the links and the joints comprised of the fourth joint JT4, the fourth link 11d, the fifth joint JT5, the fifth link 11e, the sixth joint JT6, and the sixth link 11f.

The joints JT1-JT6 are each provided with a drive motor M (see FIG. 3) as one example of an actuator which relatively rotates two members coupled through the joint. The drive motor M is, for example, a servomotor servo-controlled by the control device 3. Moreover, the joints JT1-JT6 are each provided with a rotation sensor E (see FIG. 3) which detects a rotational position of the drive motor M, and a current sensor C (see FIG. 3) which detects current for controlling the rotation of the drive motor M. The rotation sensor E is comprised of, for example, an encoder.

The control device 3 may be comprised of, for example, a processor (not illustrated) including a microcontroller, an MPU, a PLC (Programmable Logic Controller), or a logic circuit, and a memory (not illustrated) including a ROM and a RAM.

Figure 2:
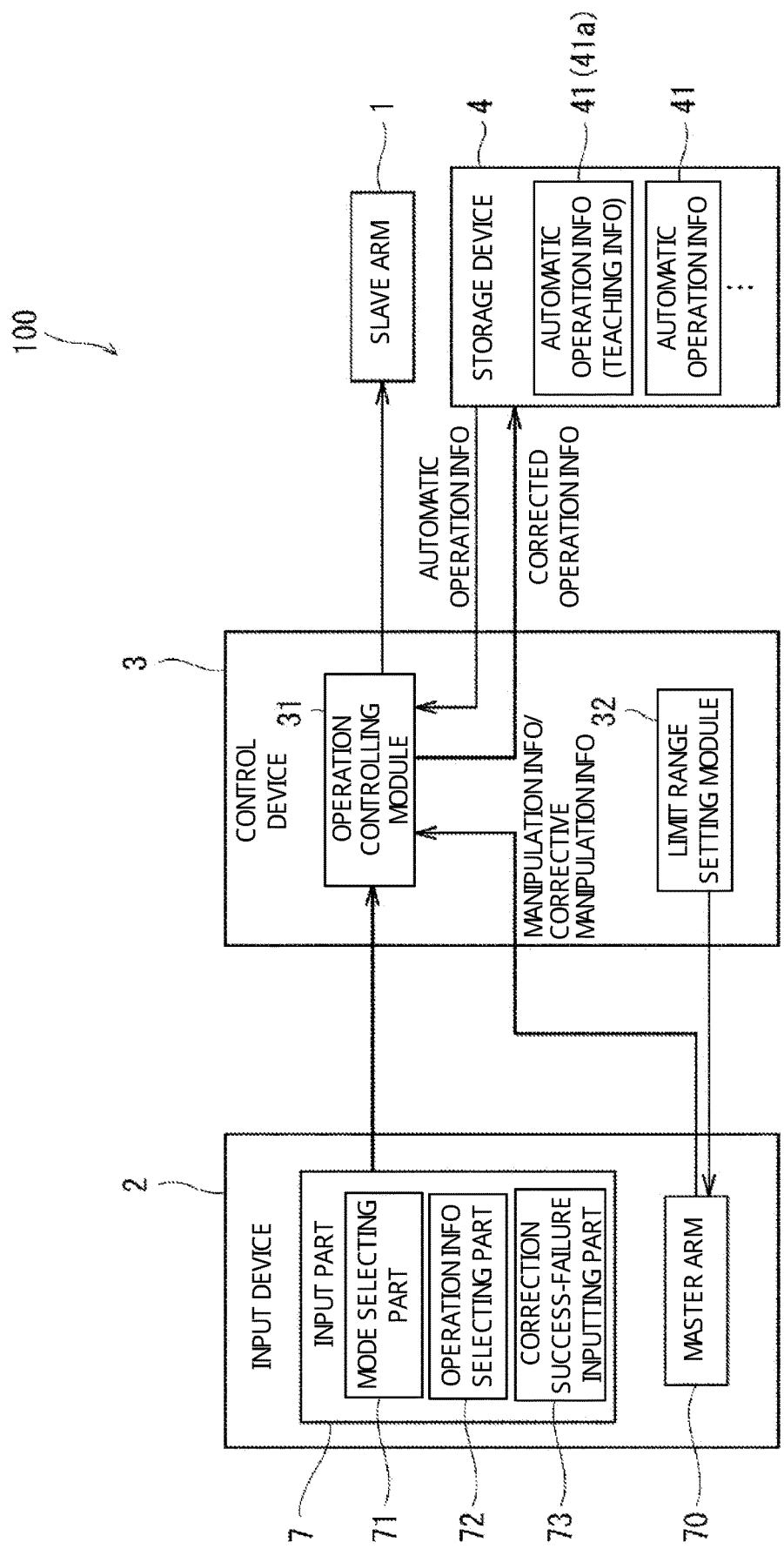
FIG. 2 is a schematic view illustrating a configuration of a control system of the robot system illustrated in FIG. 1.

FIG. 2 is a schematic view illustrating a configuration of a control system of the robot system 100 illustrated in FIG. 1. As illustrated in FIG. 2, the control device 3 includes an operation controlling module 31 and a limit range setting module 32 as functional blocks. These functional blocks can be implemented by, for example, the processor of the control device 3 reading and executing the program stored in the memory. The operation controlling module 31 controls the operation of the slave arm 1. The control of the operation of the slave arm 1 by the operation controlling module 31 will be described later in detail.

(Input Device 2)

The input device 2 is a device constituting a manipulator which is installed outside the work range of the slave arm 1, receives a manipulation instruction from the operator, and sends the received manipulation instruction to the control device 3. The input device 2 includes an input part 7 to which a given setting etc., is inputted, and the master arm 70. The input part 7 may be comprised of a switch, an adjustment knob, a control lever, an operation panel, or imaginary input buttons displayed on a display screen of a portable terminal (e.g., a tablet).

As illustrated in FIG. 2, the input part 7 includes a mode selecting part 71, an operation information selecting part 72, and a correction success-failure inputting part 73. The mode selecting part 71 is selectable of the operation mode to operate the slave arm 1 from the automatic mode, the correctable automatic mode, and the manual mode by being operated by the operator. The operation information selecting part 72 is selectable of operation information used by the operation controlling module 31 when operating the slave arm 1 in the automatic mode or the correctable automatic mode, from a plurality of operation information for operating the slave arm 1.

The correction success-failure inputting part 73 can receive an input of success-failure information whether an operational position based on corrected operation information is valid in the correctable automatic mode. That is, the correction success-failure inputting part 73 can receive an input of whether the operation of the slave arm 1 approaches the operation desired by the operator as a result of the corrective manipulation by the master arm 70.

Since a structure of the master arm 70 is similar to that of the slave arm 1, description of the structure of the master arm 70 is omitted. However, the structure of the master arm 70 may be dissimilar to that of the slave arm 1. The manipulation information is generated by the master arm 70 being moved, and the generated manipulation information is sent to the control device 3. In the robot system 100 according to this embodiment, when the manipulation information is sent to the control device 3 while the operation mode to operate the slave arm 1 is the manual mode, the slave arm 1 is controlled by the control device 3 to follow the movement of the master arm 70. When the manipulation information (corrective manipulation information) is sent to the control device 3 while the operation mode to operate the slave arm 1 is the correctable automatic mode, the automatic operation information is corrected based on the corrective manipulation information, and the operation of the slave arm 1 is controlled based on the corrected operation information after the correction.

(Camera 51 and Monitor 52)

The robot system 100 further includes a camera 51 and a monitor 52. The camera 51 images a situation of the work performed by the slave arm 1, and the monitor 52 is used by the operator to confirm the situation of the work performed by the slave arm 1. The camera 51 is installed in a space where the slave arm 1 is disposed, and the monitor 52 is installed in a space where the master arm 70 is disposed. The operator manipulates the master arm 70 while watching the working situation of the slave arm 1 displayed on the monitor 52. The camera 51 and the monitor 52 are connected to each other via the control device 3, and the image information captured by the camera 51 is sent to the monitor 52 via the control device 3. However, the camera 51 and the monitor 52 may be connected to each other not via the control device 3, but connected directly or via other devices. The camera 51 and the monitor 52 may be wiredly or wirelessly connected to each other.

(Storage Device 4)

The storage device 4 is a readable and writable recording medium, and stores information as automatic operation information 41 which causes the slave arm 1 to automatically perform a given operation. The automatic operation information 41 is unnecessarily whole information required to cause the slave arm 1 to automatically perform the given operation, but may be partial information. Moreover, the automatic operation information 41 may be any information as long as it is related to the operation of the slave arm 1. For example, the automatic operation information 41 may be orbital information including time-series data, or may be path information representing postures of the slave arm 1 at discrete positions with a given time interval. The automatic operation information 41 may include a speed of the operation of the slave arm 1 along the path.

The storage device 4 stores at least one automatic operation information 41, and one of them is, for example, teaching information 41a stored through a teaching in which the slave arm 1 is operated to perform the given work. Although in this embodiment the automatic operation information 41 as the teaching information 41a is the information stored by manipulating the master arm 70 to instruct the slave arm 1 to operate, it is not limited to this and may be information stored in any teaching method. For example, the automatic operation information 41 as the teaching information 41a may be information stored through the direct teaching. Note that although in the robot system 100 according to this embodiment the storage device 4 is provided separately from the control device 3, it may be provided integrally with the control device 3.

(Operation Control of Slave Arm 1)

Below, a control of the operation of the slave arm 1 by the operation controlling module 31 is described with reference to FIG. 2.

At least one of the automatic operation information 41 stored in the storage device 4 is sent to the operation controlling module 31 as the automatic operation information which causes the slave arm 1 to operate automatically. Moreover, the manipulation information generated through the manipulation of the master arm 70 is sent to the operation controlling module 31.

The operation controlling module 31 uses one of the automatic operation information and the manipulation information, or both of them, according to the operation mode selected by the mode selecting part 71.

When the operation mode selected through the mode selecting part 71 is the manual mode, the operation controlling module 31 uses the manipulation information. In detail, when the operation mode to operate the slave arm 1 is the manual mode, the operation controlling module 31 controls the operation of the slave arm 1 in accordance with the manipulation information (inputted command) sent through the manipulation of the master arm 70 without using the automatic operation information 41 stored in the storage device 4.

Moreover, when the operation mode selected through the mode selecting part 71 is the automatic mode, the operation controlling module 31 uses the automatic operation information. In detail, when the operation mode to operate the slave arm 1 is the automatic mode, the operation controlling module 31 controls the operation of the slave arm 1 based on the automatic operation information sent from the storage device 4 in accordance with the task program set in advance without using the manipulation information sent from the master arm 70.

Moreover, when the operation mode selected by the mode selecting part 71 is the correctable automatic mode, the operation controlling module 31 uses both of the automatic operation information and the manipulation information (corrective manipulation information). Note that when the operation mode is the correctable automatic mode and the corrective manipulation information is not sent to the operation controlling module 31, the operation controlling module 31 uses only the automatic operation information. In more detail, when the operation mode to operate the slave arm 1 is the correctable automatic mode and the corrective manipulation information is received during the automatic operation of the slave arm 1 using the automatic operation information, the operation controlling module 31 corrects the automatic operation information based on the received corrective manipulation information and controls the operation of the slave arm 1 based on the corrected operation information after the correction. Accordingly, the slave arm 1 performs the operation related to the automatic operation information, that is, performs the operation corrected from the operation which was to be performed automatically.

Figure 3:
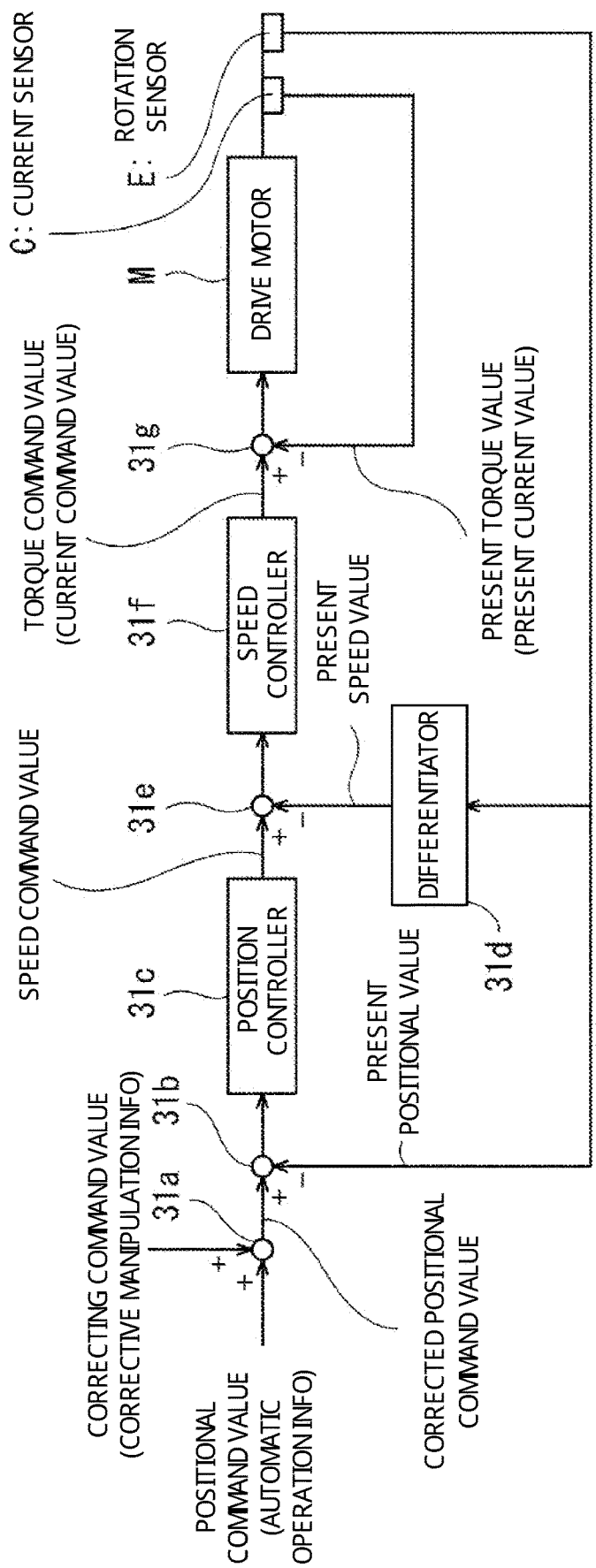
FIG. 3 is a view illustrating one example of a block diagram of a control system of an operation controlling module illustrated in FIG. 2.

Below, the correction of the operation of the slave arm 1 when the operation mode to operate the slave arm 1 is the correctable automatic mode, is described with reference to FIG. 3. FIG. 3 is a view illustrating one example of a block diagram of a control system of the operation controlling module 31 illustrated in FIG. 2. In this example, the automatic operation information and the corrective manipulation information are orbital information including time-series data, for example.

The operation controlling module 31 includes an adder 31a, subtractors 31b, 31e, and 31g, a position controller 31c, a differentiator 31d, and a speed controller 31f. The operation controlling module 31 controls a rotational position of the drive motor M of the slave arm 1 using a command value based on the automatic operation information and a command value based on the corrective manipulation information.

The adder 31a adds a correcting command value based on the corrective manipulation information to a positional command value based on the automatic operation information so as to generate a corrected positional command value. The adder 31a sends the corrected positional command value to the subtractor 31b.

The subtractor 31b subtracts a present positional value detected by the rotation sensor E from the corrected positional command value so as to generate an angular deviation. The subtractor 31b sends the generated angular deviation to the position controller 31c.

The position controller 31c generates a speed command value based on the angular deviation sent from the subtractor 31b, by arithmetic processing based on a transfer function and a proportional coefficient set in advance. The position controller 31c sends the generated speed command value to the subtractor 31e.

The differentiator 31d differentiates the present positional value detected by the rotation sensor E to generate an amount of change in the rotational angle of the drive motor M per unit time, that is, a present speed value. The differentiator 31d sends the generated present speed value to the subtractor 31e.

The subtractor 31e subtracts the present speed value sent from the differentiator 31d, from the speed command value sent from the position controller 31c so as to generate a speed deviation. The subtractor 31e sends the generated speed deviation to the speed controller 31f.

The speed controller 31f generates a torque command value (current command value) based on the speed deviation sent from the subtractor 31e, by arithmetic processing based on a transfer function and a proportional coefficient set in advance. The speed controller 31f sends the generated torque command value to the subtractor 31g.

The subtractor 31g subtracts a present current value detected by the current sensor C from the torque command value sent from the speed controller 31f so as to generate a current deviation. The subtractor 31g sends the generated current deviation to the drive motor M so as to drive the drive motor M.

As described above, the operation controlling module 31 controls the drive motor M so as to control the slave arm 1 to perform the operation corrected from the operation based on the automatic operation information. Note that when the operation mode of the slave arm 1 is the automatic mode, the positional command value based on the automatic operation information is sent to the subtractor 31b. When the operation mode of the slave arm 1 is the manual mode, a positional command value based on the manipulation information is sent to the subtractor 31b.

When the slave arm 1 performs the corrected operation, the storage device 4 automatically stores the corrected operation information which causes the slave arm 1 to perform the corrected operation, as the automatic operation information 41. However, when the slave arm 1 performs the corrected operation, the storage device 4 may be selectable of whether to store the corrected operation information as the automatic operation information 41. In this case, for example, after the slave arm 1 finishes the corrected operation, the control device 3 may inquire to the input device 2 whether to store the corrected operation.

In the subsequent operation, the operation controlling module 31 can use as the automatic operation information the corrected operation information stored in the storage device 4 as the automatic operation information 41. In this embodiment, the operation controlling module 31 controls the operation of the slave arm 1 using the latest automatic operation information 41 stored in the storage device 4 as the automatic operation information. Note that, instead of using as the next automatic operation information the corrected operation information to which the corrective manipulation is fully reflected, corrected operation information to which a part of or a given rate of the corrective manipulation is reflected may be used as the next automatic operation information.

Below, a concrete example of correcting the operation of the slave arm 1 by the robot system 100 is described with reference to FIGS. 4A to 4C. In this example, the slave arm 1 grips a workpiece 61 formed with a hole 61a, and is manipulated so that the workpiece 61 is brought to fit the hole 61a thereof onto a pin 62 fixed to a given position.

Figure 4A:
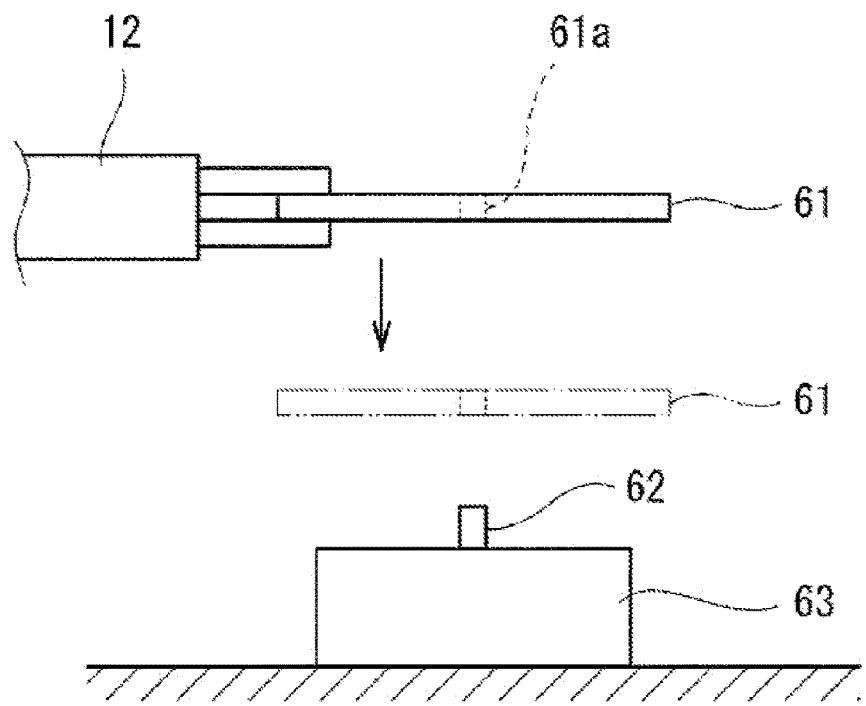
FIG. 4A is a view illustrating an example of operation of a hand part of the robot system according to this embodiment.

FIG. 4A is a view illustrating an operation example of a hand part of the robot system according to this embodiment. As illustrated in FIG. 4A, the pin 62 is provided to a frame 63 of a certain product, and the frame 63 is fixed to a floor of a factory. The pin 62 projects vertically upwardly from the frame 63. Moreover, the workpiece 61 is a bracket in a flat-plate shape, which is to be attached to the frame 63. A hand part 12 which grips the workpiece 61 is attached as the end effector to the wrist part 14 of the slave arm 1. The workpiece 61 is held by the hand part 12 of the slave arm 1.

In this work, for example, the operator manipulates the master arm 70 in the manual mode in advance to operate the slave arm 1 so that the operation controlling module 31 creates the automatic operation information 41 (the teaching information 41a) and the storage device 4 stores it.

Figure 4B:
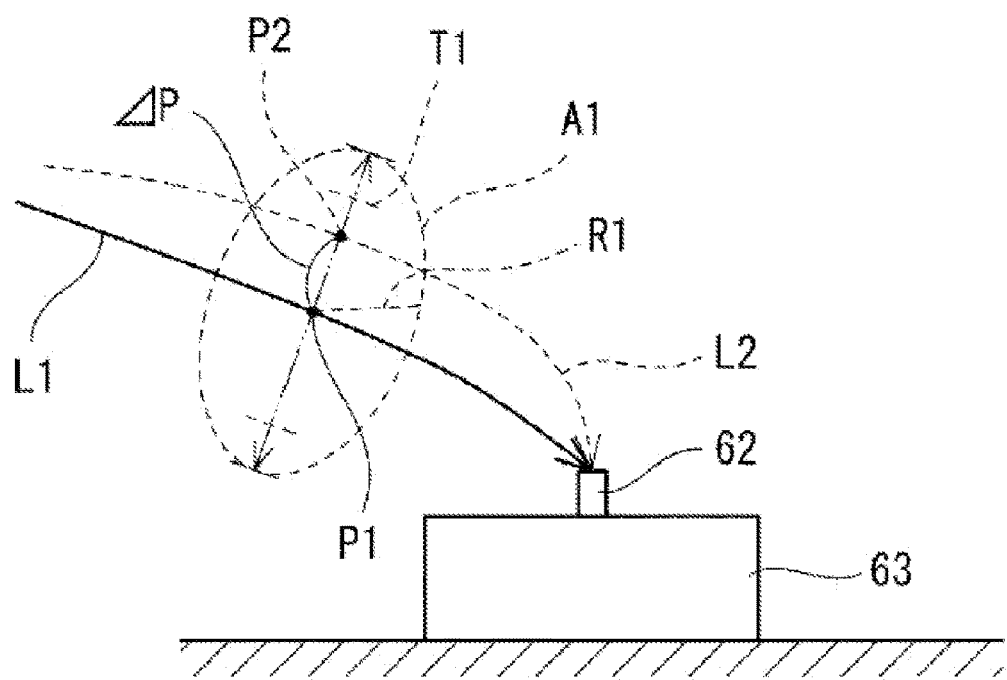
FIG. 4B is a view illustrating an operation path of the hand part illustrated in FIG. 4A based on automatic operation information.
Figure 4C:
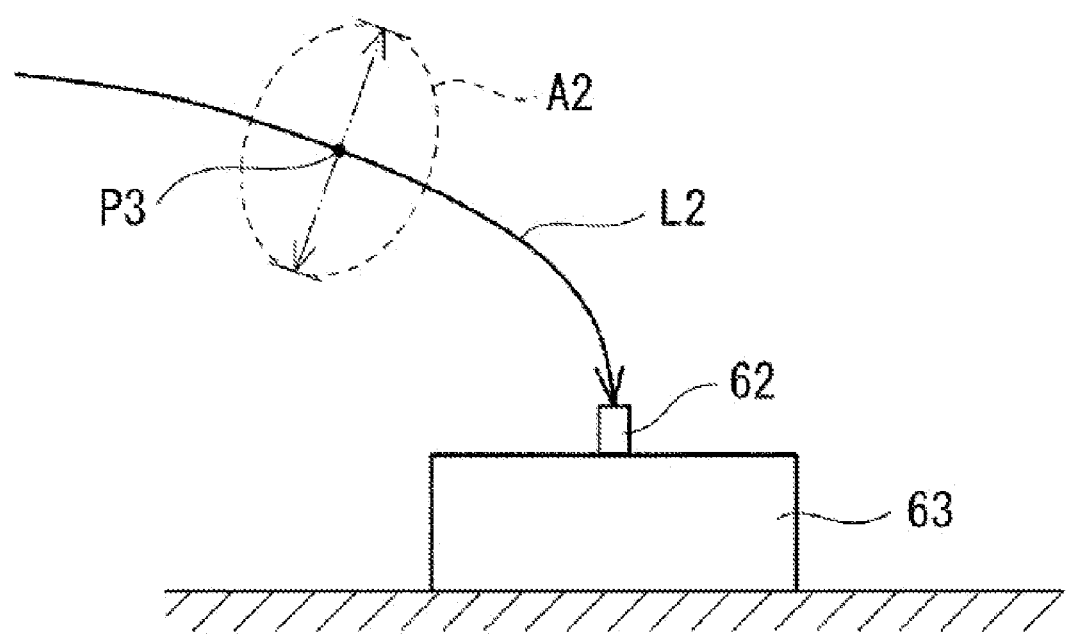
FIG. 4C is a view illustrating an operation path based on corrected operation information in FIG. 4B.

FIG. 4B is a view illustrating an operation path of the hand part 12 illustrated in FIG. 4A based on the automatic operation information, and FIG. 4C is a view illustrating an operation path based on corrected operation information in FIG. 4B. Illustration of the hand part 12 and the workpiece 61 is omitted in FIGS. 4B and 4C. In the correctable automatic mode, the operation controlling module 31 controls the slave arm 1 so that the hand part 12 moves along an operation path L1 unless the corrective manipulation by the master arm 70 (the manipulator) is performed. Note that in FIG. 4B the operation path L1 indicates a position of the hole 61a of the workpiece 61 gripped by the hand part 12.

When the corrective manipulation is performed during the movement of the hand part 12 based on the automatic operation information, the operation controlling module 31 acquires the corrective manipulation information based on the corrective manipulation by the master arm 70, and controls the slave arm 1 to perform the corrected operation based on the corrective manipulation information. The storage device 4 stores the corrected operation information based on the corrected operation as the next automatic operation information 41. In FIG. 4B, an operation path L2 based on the corrected operation information is indicated by a broken line.

In the correctable automatic mode, the operation controlling module 31 executes a given limiting processing when the corrective manipulation is performed beyond a given limit range A1 from the operational position of the slave arm 1 based on the automatic operation information. For example, as the given limiting processing, the operation controlling module 31 regulates the slave arm 1 from moving outside of the limit range A1. The limitation of the movement includes inhibiting the movement of the slave arm 1 by an amount corresponding to the amount of manipulation by the master arm 70 beyond the limit range A1, and reducing an amount of operation of the slave arm 1 (reducing a moving speed of the slave arm 1) with respect to the amount of manipulation by the master arm 70 beyond the limit range A1. Note that the given limiting processing is not limited to limiting the movement of the slave arm, but various limiting processing can be adopted. For example, the various limiting processing include inhibiting the master arm 70 being manipulated more than the amount corresponding to the limit range A1, slowing down the motion of the master arm 70 (making the motion heavier), and alarming the operator.

In order to execute such given limiting processing, the limit range setting module 32 sets the limit range for the corrective manipulation by the master arm 70. In the example of FIG. 4B, the limit range A1 at a certain operational position P1 is defined as a circle (or a sphere) with a radius R1 centering on the operational position P1 on an imaginary plane perpendicular to the moving direction of the slave arm 1.

(Limit Range Setting Processing)

Figure 5:
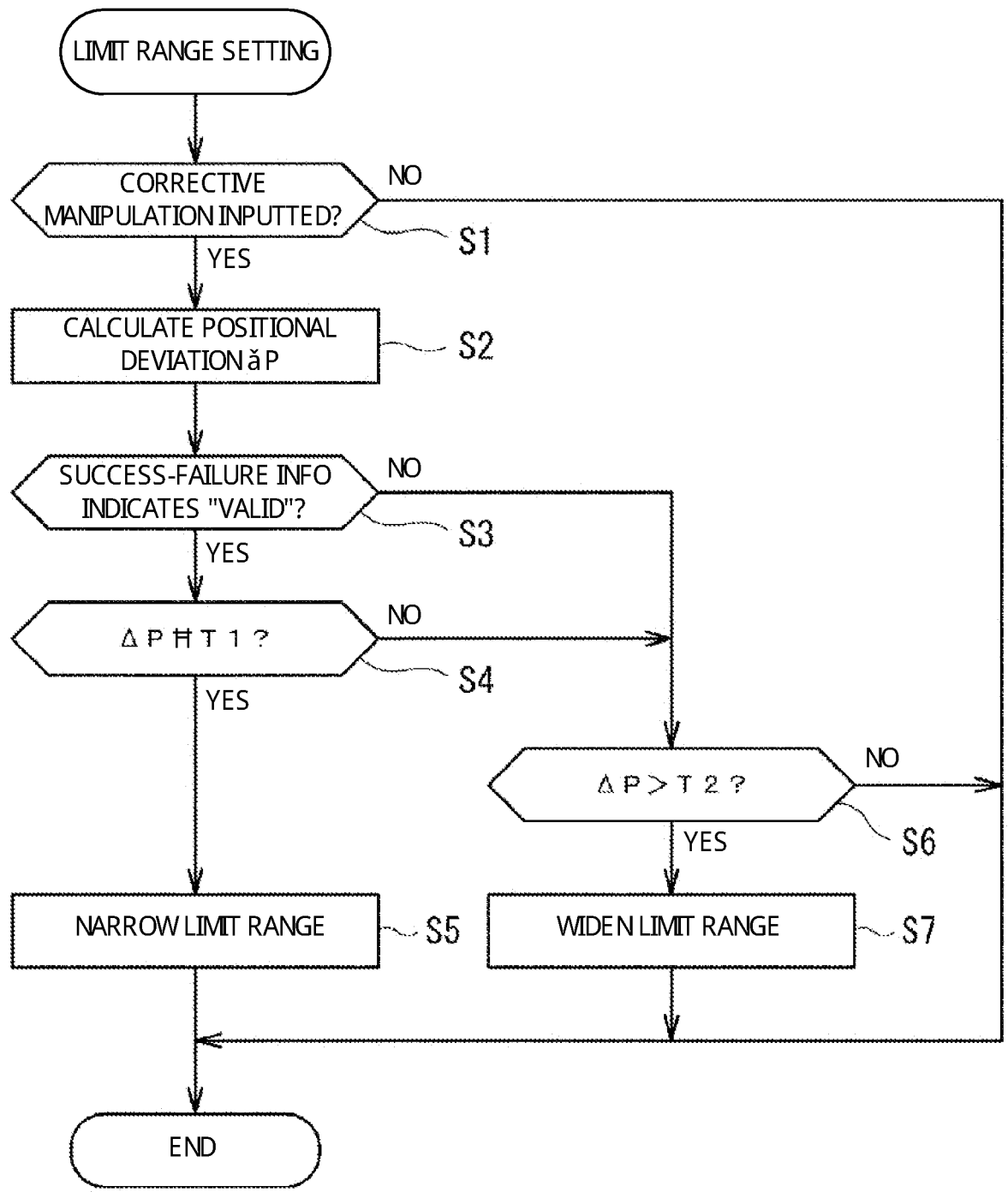
FIG. 5 is a flowchart illustrating a flow of a limit range setting processing according to this embodiment.

When the corrective manipulation is performed in the correctable automatic mode, the limit range setting module 32 executes a limit range setting processing related to the change in the limit range. FIG. 5 is a flowchart illustrating a flow of the limit range setting processing according to this embodiment.

After operation for a given period of time finishes, the limit range setting module 32 determines whether a corrective manipulation is performed during the series of operation for the given time period (Step S1). The given period of time can be freely set, for example in FIG. 4A, set to a period for performing one process from the gripping of the workpiece 61 by the hand part 12 to the moving of the workpiece 61 so that the hole 61a of the workpiece 61 fits onto the pin 62 fixed to the given position.

If the limit range setting module 32 determines that the corrective manipulation is performed (Step S1: YES), the limit range setting module 32 calculates a positional deviation $\Delta P$ between the operational position P1 based on the automatic operation information before the correction, and an operational position P2 based on the corrected operation information (Step S2). The calculated positional deviation $\Delta P$ is temporarily stored in the memory of the control device 3.

Moreover, the input device 2 urges the operator to input into the correction success-failure inputting part 73 whether the corrected operation of the slave arm 1 based on the corrective manipulation is valid. For example, when the correction success-failure inputting part 73 is configured by imaginary input buttons being displayed on a display screen of the input device 2, the imaginary input buttons (a success button and a failure button) are displayed on the display screen.

The operator inputs through the correction success-failure inputting part 73 whether the corrected operation of the slave arm 1 is valid. For example, when the corrected operation of the slave arm 1 is recognized to approach the operation desired by the operator, the operator inputs "valid." For example, when the two imaginary input buttons are displayed on the monitor of the input device 2 as described above, the operator presses the success button among the two buttons. When the operator inputs "valid," success-failure information indicating that the corrected operation of the slave arm 1 (the operational position based on the corrected operation information) is valid, is sent to the limit range setting module 32 of the control device 3.

The limit range setting module 32 determines whether the success-failure information received from the input device 2 is the information indicating "valid" (Step S3). If the success-failure information indicates "valid" (Step S3: YES), the limit range setting module 32 changes the limit range for the next operation of the slave arm 1 according to an amount of the corrective manipulation in the correctable automatic mode. In more detail, the limit range setting module 32 determines whether the positional deviation ΔP is at or below a first threshold T1 (Step S4). If the positional deviation ΔP is at or below the first threshold T1 (Step S4: YES), the limit range setting module 32 narrows the limit range from the first limit range A1 to a second limit range A2 (<A1) in the next corrective manipulation by the master arm 70.

That is, in this embodiment, when the positional deviation ΔP is at or below the first threshold, and the success-failure information indicating that the operational position based on the corrected operation information is valid is inputted, the limit range is narrowed.

For example, in FIG. 4B, the operational position P2 based on the corrected operation information after the corrective manipulation with respect to the operational position P1 based on the automatic operation information, is a position corresponding to the manipulation from the operational position P1 by an amount at or below the first threshold. Therefore, as illustrated in FIG. 4C, when the slave arm 1 operates based on the corrected operation information as the automatic operation information next time, the limit range at a certain operational position P3 on the operation path L2 is the second limit range A2 narrower than the first limit range A1. For example, when the radius R1 of the first limit range A1 is 10 mm, a radius R2 of the second limit range A2 is set to 3 mm.

In this embodiment, the limit range setting module 32 calculates the positional deviations ΔP between the operational positions P1 with a given time interval and the corresponding operational positions P2 based on the corrected operation information, and compares the largest value of the positional deviation ΔP with the first threshold T1. Alternatively, the operation path L1 is calculated based on the operational positions P1 with the given time interval using approximate processing, the operation path L2 is calculated based on the operational positions P2 on the basis of the corrected operation information corresponding to the operational positions P1, and the largest value of the positional deviation ΔP obtained based on the operation path L1 and the operation path L2 may be compared with the first threshold T1. Moreover, the positional deviation ΔP may be calculated in partial ranges of the operation paths L1 and L2. Further, the limit range setting module 32 may compare with the first threshold T1 an average value of the positional deviations ΔP at a plurality of operational positions.

According to this configuration, the operation of the slave arm 1 can be corrected in real time based on the corrective manipulation by the master arm 70 during the operation of the slave arm 1 based on the automatic operation information. Moreover, the given limit range A1 is set for the corrective manipulation, and the given limiting processing is executed when the corrective manipulation is performed beyond the limit range A1. When the positional deviation ΔP between the operational position P1 based on the automatic operation information before the correction and the operational position P2 based on the corrected operation information is at or below the first threshold T1, the limit range in the next operation of the slave arm 1 based on the corrected automatic operation information is set to the limit range A2 narrower than the first limit range A1 used in the preceding operation. As a result, when the amount of correction from the automatic operation information is smaller, the given limiting processing is more easily started in the next corrective manipulation. In this manner, the range in which the corrective manipulation is permitted without limitation becomes narrower as the correcting amount decreases. Therefore, when the correction of the operation of the slave arm 1 is repeated, the operation of the slave arm 1 can be more easily converged to an ideal operation. Thus, the operation of the slave arm 1 set in advance can be corrected easily and appropriately.

In this embodiment, if the success-failure information does not indicate "valid," that is, if the failure button is pressed by the operator in the above example (Step S3: NO) or when the positional deviation ΔP is above the first threshold T1 (Step S4: NO), the limit range setting module 32 determines whether the positional deviation ΔP is above a second threshold T2 (Step S6). If the positional deviation ΔP is above the second threshold T2 (Step S6: YES), the limit range setting module 32 widens the limit range from the first limit range A1 to a third limit range A3 (>A1) in the next corrective manipulation by the master arm 70 (Step S7).

That is, when the positional deviation ΔP is above the second threshold T2, the limit range becomes wider than the previous one. Therefore, when the amount of correction from the automatic operation information is larger, the given limiting processing is difficult to be started in the next corrective manipulation. In this manner, the range in which the corrective manipulation is permitted without limitation becomes wider as the correcting amount increases, and thus, the amount of manipulation required for the correction is secured. Particularly, this is effective when the operational position is required to be changed comparatively largely due to the lot change of the workpiece.

Note that in this embodiment the positional deviation ΔP is calculated even when the success-failure information indicating that the operational position based on the corrected operation information is invalid, is inputted. However, the limit range may be maintained or widen without calculating the positional deviation ΔP if the success-failure information does not indicate "valid" (Step S3: NO). Moreover, if the positional deviation ΔP is larger than the first threshold T1 (Step S4: NO), the limit range may be maintained or widen without calculating the positional deviation ΔP.

Moreover, the correction success-failure inputting part 73 may not be provided, and the limit range may be changed without the success-failure determination by the operator. For example, the limit range may be changed only based on the positional deviation ΔP. In detail, the limit range setting module 32 may narrow the limit range when the positional deviation ΔP is at or below the first threshold T1, and may widen the limit range when the positional deviation ΔP is above the second threshold T2. Moreover, the limit range setting module 32 may determine whether the operational position based on the corrected operation information is valid, on the basis of a certain index. For example, the limit range setting module 32 may calculate a radius of curvature at a given operational position on the operation path of the slave arm 1 (hand part 12) defined based on the corrected operation information, and may determine as "valid" when the radius of curvature is at or above a given threshold (a third threshold). That is, the limit range setting module 32 may determine that the corrected operation information is "valid" when there is no sharply curving point on the operation path.

Moreover, the values of the first threshold T1 and the second threshold T2 are not particularly limited as long as T1<T2. For example, the values of the first threshold T1 and the second threshold T2 may be the same. Note that when the values of the first threshold T1 and the second threshold T2 are different, the limit range setting module 32 may maintain (may not change) the limit range when the positional deviation ΔP is above the first threshold T1 and at or below the second threshold.

Moreover, the first threshold T1 and/or the second threshold T2 may be smaller or larger than, or the same as a border value of the limit range A1. Moreover, when the limit range is changed, the first threshold T1 and/or the second threshold T2 may be changed according to the size of the limit range. For example, the first threshold T1 and the second threshold T2 may be set to values of given ratios (e.g., a half) with respect to the radii R1 and R2 defining the limit ranges A1 and A2, respectively. Alternatively, the first threshold T1 and/or the second threshold T2 may be set to a constant value regardless of the change in the limit range.

Moreover, a plurality of thresholds for narrowing the limit range (the first threshold T1) may be provided so as to narrow the limit range in phases according to the value of the positional deviation ΔP.

Moreover, although in this embodiment the limit range is set centering on the operational position P1 (i.e., a distance from the operational position P1 to the border of the limit range is equal with the radius R1), the configuration of setting the limit range is not limited to this. For example, the limit range may be offset in a certain direction from the operational position P1. For example, when the operation path L1 based on the automatic operation information has a curved shape, the limit range may be set so that the limit range inside the curve (the curvature center side) is smaller than that outside the curve (or vice versa).

Other Embodiments

Although one embodiment of the present disclosure is described, the present disclosure is not limited to this embodiment, and various improvements, changes, and modifications are possible without departing from the spirit of the present disclosure.

For example, although in the embodiment described above the robot system 100 utilizing the master-slave robot is described, the present disclosure is applicable to a robot system other than the master-slave robot system. For example, the manipulator which performs the corrective manipulation in the correctable operation mode may not include the master arm 70.

For example, instead of the master arm 70, a correcting position inputting part may be provided as the input device 2, which is changeable of, based on a manipulation by the operator, the operational position of the operating slave arm 1 on the operation path L1 based on the automatic operation information. The corrective position inputting part is configured to be manipulatable, and may be comprised of a directional switch, a control lever, or a portable terminal such as a tablet. When the operator inputs to manipulate in a given direction using such a corrective position inputting part, the corrective manipulation information for performing the positional correction of the slave arm 1 in the given direction from the operational position by an amount corresponding to a period of the manipulating input, or an amount of the manipulating input, is generated. Also according to this configuration, effects similar to the embodiment described above can be achieved.

Moreover, although in the embodiment described above, the manipulators, such as the mode selecting part 71 and the operation information selecting part 72, are provided to the single input device 2, they may be provided to separate input devices.

INDUSTRIAL APPLICABILITY

The present disclosure is useful for providing a robot system, capable of easily and appropriately correcting an operation of a robot, which is set in advance.

DESCRIPTION OF REFERENCE CHARACTERS

1 Slave Arm (Robot Body)
4 Storage Device (Memory)
31 Operation Controlling Module
32 Limit Range Setting Module
41 Automatic Operation Information
70 Master Arm (Manipulator)
73 Correction Success-Failure Inputting Part
100 Robot System

What is claimed is:

1. A robot system, comprising:
a robot body;
a memory configured to store automatic operation information for causing the robot body to perform a given operation;
an operation controlling module configured to control the operation of the robot body based on the automatic operation information;
a master arm configured to generate corrective manipulation information based on a corrective manipulation manually performed by an operator for correcting the operation of the robot body under operation based on the automatic operation information; and
a limit range setting module configured to set a limit range of the corrective manipulation via the master arm, wherein
the operation controlling module acquires the corrective manipulation information and controls the robot body to perform a corrected operation based on the corrective manipulation information,
the memory stores corrected operation information based on the corrected operation as next automatic operation information,
the operation controlling module executes a given limiting processing when the corrective manipulation is performed beyond the limit range from an operational position based on the automatic operation information, wherein the operation controlling module regulates the robot body from moving outside the limit range as the given limiting processing, and
the limit range setting module calculates a positional deviation between the operational position based on the automatic operation information before the correction and an operational position based on the corrected operation information, and, when the positional deviation is at or below a first threshold, narrows the limit range in a next corrective manipulation via the master arm.

2. The robot system of claim 1, wherein the limit range setting module widens the limit range in the next corrective manipulation via the master arm when the positional deviation is above a second threshold that is larger than the first threshold.

3. The robot system of claim 1, wherein
the master arm includes a correction success-failure inputting part configured to receive an input of success-failure information concerning whether the operational position based on the corrected operation information is valid, and the limit range setting module narrows the limit range when the positional deviation is at or below the first threshold and the inputted success-failure information indicates that the operational position based on the corrected operation information is valid.

4. The robot system of claim 1, wherein the robot body includes a slave arm, and the master arm is installed outside a work range of the slave arm.

* * * * *